INVENTOR.
RAYMOND H. BOWMAN
BY
McNENNY, FARRINGTON, PEARNE & GORDON
ATTORNEYS

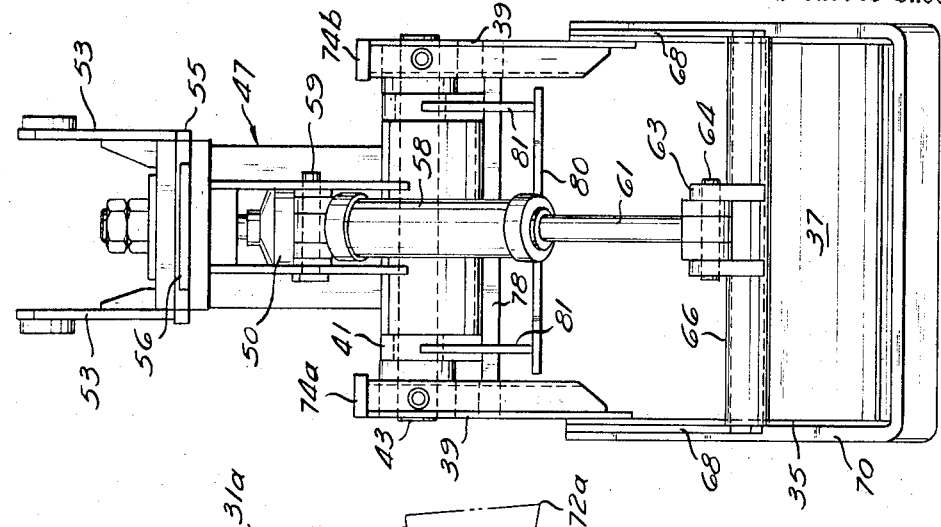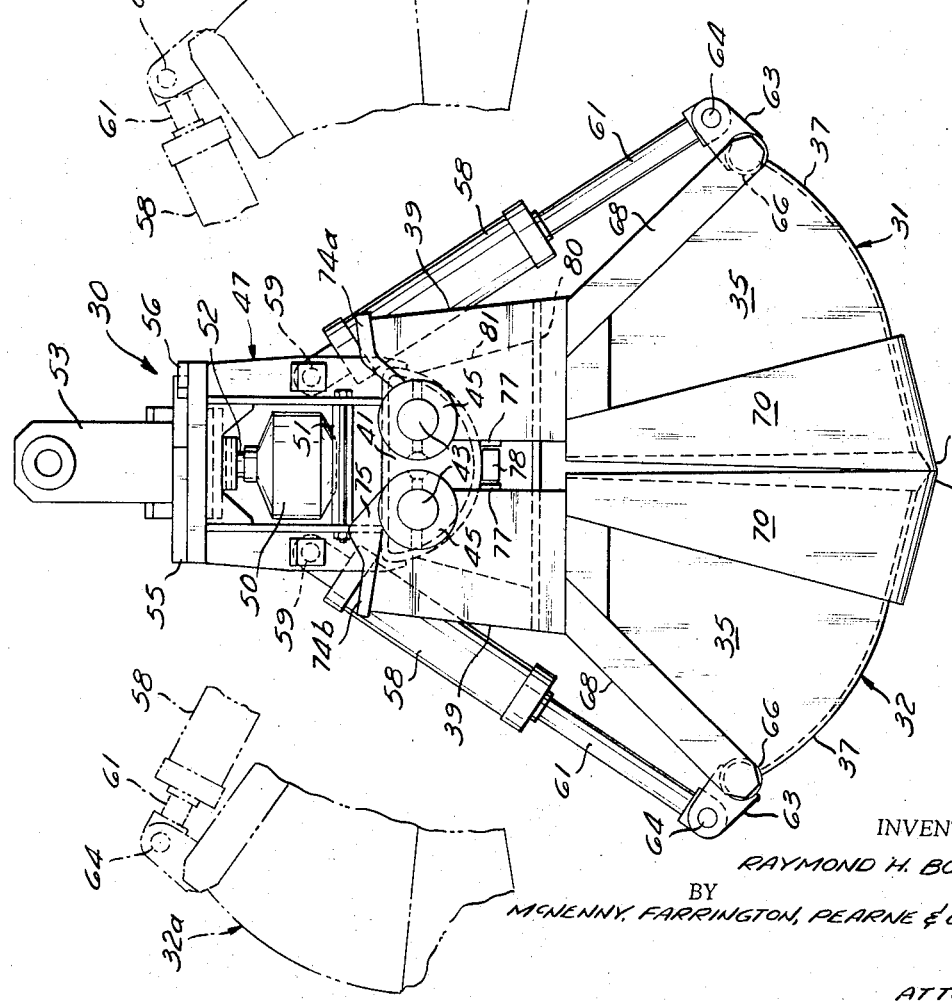

United States Patent Office 3,367,523
Patented Feb. 6, 1968

3,367,523
COMPACTION BUCKET
Raymond H. Bowman, Cuyahoga Falls, Ohio, assignor to McDowell-Wellman Engineering Company, Cleveland, Ohio, a corporation of Ohio
Filed May 19, 1966, Ser. No. 551,464
8 Claims. (Cl. 214—147)

ABSTRACT OF THE DISCLOSURE

Positive force applying material compacting means in the form of a plate is associated with the clam shell bucket of material handling mechanism to compact material dumped into a vehicle such as a truck or railroad car.

The present invention relates generally to bulk material handling apparatus and more particularly to an improved method and apparatus for compacting loose bulked materials.

Certain bulked materials, i.e. materials having a relatively high air space to solid matter ratio such as trash, are most efficiently transported if they are first compacted to reduce the amount of unusable bulked air space.

The equipment used to load these materials generally includes some form of a bucket assembly. In the case of a cable suspended clam-shell bucket assembly, it has been the practice to use the bucket assembly to compact the bulked material by dropping it upon the material after it has been dumped into a transportable container such as a truck or a railroad car.

The previously available methods and apparatus have had a number of disadvantages. For example, when the bucket assembly was dropped upon the material to compact it, the compacting force was limited by the weight of the bucket assembly and the height from which it was dropped. And, it was first necessary to reclose the scoops of the bucket assembly after dumping the load before dropping it and then to reopen the scoops in order to pick up another load. These disadvantages not only limited the operator's control over the compacting process, but also lengthened the time required to complete a loading cycle and increased the wear upon the loading equipment.

The present invention overcomes the above disadvantages by utilizing a novel clam-shell bucket assembly mounted on a ram member of the loading unit. The novel bucket assembly of the present invention includes a downwardly facing compaction plate which is exposed when the scoops are in the fully opened position. Thus, it is not necessary to close the scoops in order to obtain a compacting surface. By mounting the bucket assembly upon a power driven ram, a greater compacting force can be exerted upon the material, and the bucket assembly can be manipulated closer to the sides of the container to compact more of the load. Therefore, with the present invention, the operator not only has a greater degree of control over the compacting process but also is not required to close and reopen the scoops of the bucket assembly each time a load is compacted.

It is an important object of the present invention to provide an improved material handling bucket assembly.

Another important object of the present invention is to provide an improved method for compacting bulk material.

Further features and advantages of the invention will readily appear to those skilled in the art upon a more complete understanding of the preferred embodiment of the invention as applied to a clam-shell bucket assembly as shown and described in the following description and drawings, wherein:

FIGURE 2 is an elevation view of the bucket assembly in a closed position with the open position shown in phantom; and FIGURE 3 is an end view of the bucket assembly.

Figure 1:
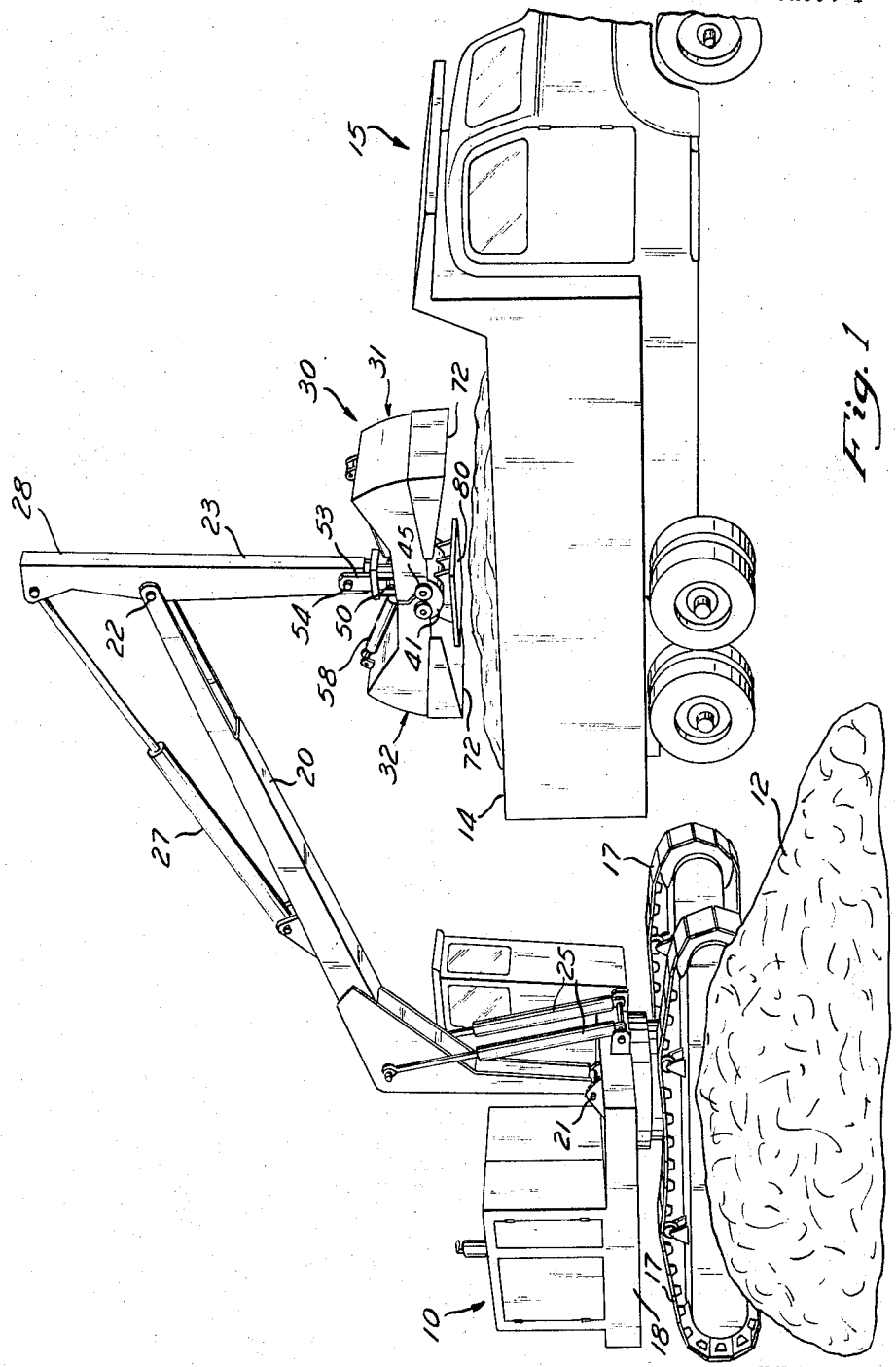
FIGURE 1 is a perspective view illustrating the novel clam-shell bucket assembly of the present invention in operation.

FIGURE 1 illustrates a mobile crane or back hoe 10 in the process of picking up bulked material such as trash from a pile 12 and compacting it into the bed 14 of a truck 15. The crane 10 includes a platform 18 mounted upon crawler treads 17. A boom 20 is pivoted at its inner end about the point 21 on the platform 18. A vertically disposed stick 23 is pivoted about the point 22 on the outer end of the boom 20. A pair of vertically mounted hoist cylinders 25 pivot the boom 20 about the point 21. The stick 23 is pivoted about the point 22 by a stick cylinder 27 operatively connected between an intermediate portion of the boom 20 and the upper end portion 28 of the stick 23. Rotatably mounted on the lower end of the stick 23 is the novel clam-shell bucket assembly 30 of the present invention.

Referring to FIGURES 2 and 3, the bucket assembly 30 includes a pair of substantially identical scoops 31 and 32. Each scoop being composed of a pair of side plates 35, a bottom plate 37, and a pair of hinge plates 39. The bucket assembly 30 is provided with a double hinge suspension in that each scoop is pivoted about a separate hinge pin 43 on a central hinge block 41. For added strength, the hinge pins 43 extend all the way through the hinge block 41 and have their ends journalled within enlarged bushings 45 on the hinge plates 39. The hinge pins 43 are also spaced from each other on the hinge block 41 so that each scoop may rotate independently of the other.

Secured to the top of the hinge block 41 is a rotor housing 47 in which is mounted a rotor 50. The hinge block 41 and housing 47 form the frame portion of the bucket assembly 30. The lower end of the rotor 50 is fixed to the rotor housing 47 by a support plate 51. A rotor shaft 52 extends through the top of the housing 47 and is secured to a yoke 53 which rotates relative to the housing 47. The yoke 53 in turn is pivotally secured at 54 to the lower end of the stick 23 so that the bucket pivots in a substantially vertical plane about a fixed horizontal axis and hangs vertically from the lower end of the stick and, upon actuation of the rotor 50, the entire bucket assembly 30 rotates about the lower end of the stick 23 in a substantially horizontal plane. The rotation of the bucket assembly 30 is limited to approximately 210° by the engagement of a stop plate 55 on the yoke 53 with a stop 56 on the housing 47.

The open position of the scoops 31 and 32 is shown in phantom at 31a and 32a in FIGURE 2. Each of the scoops 31 and 32 is opened and closed by a hydraulic scoop cylinder 58 extending between the rotor housing 47 and the outer edge of the scoop. The body of each cylinder 58 pivots about a pin 59 on the rotor housing 47, and the piston rod 61 pivots about a pin 64 secured to a cylinder bracket 63 attached to the scoop. Each cylinder bracket 63 is centrally mounted to a transverse back tube 66 and extends outwardly from the outer edge of the scoop to increase the effective moment arm of the hydraulic scoop cylinders 58 and to assure the maximum closing power.

The upper portions of the scoops are reinforced by sidebands 68 while the mating faces of the scoops are reinforced by lips 70. The portion of the lip 70 extending along the bottom plate 37 forms a cutting lip 72 on each scoop.

The upper portions of the hinge plates 39 are provided with contact bumper portions 74a and 74b which abut one another in the open position to limit the rotation of the scoops. The bumper portion 74b on each scoop is also provided with a stop boss 75 which, in the fully open position of the scoops, engages the external surface of the bushing 45 for the other scoop to prevent both scoops from rotating together relative to the hinge block 41 once the bumpers 74a and 74b are in abutment. To prevent the cutting lips 72 from banging into one another when the scoops close, each hinge plate 39 is also provided with a bumper block 77 which abuts a fixed bumper block 78 secured to the hinge block 41.

A substantially horizontal compaction plate 80 is disposed below and rigidly secured to the hinge block 41 by a series of vertical plates 81. When the scoops 31 and 32 are in the open position, the compaction plate 80 lies in a substantially horizontal plane roughly defined by the cutting lips 72 of the scoops 31 and 32.

In operation, the operator manipulates the bucket assembly 30 in the normal manner to pick up the bulked material from the pile 12 and to dump it into the truck bed 14. However, to compact the material in the truck bed, the operator leaves the scoops 31 and 32 in the open position after the material has been dumped and actuates the hoist cylinders 25 to exert a positive downward force upon the open bucket assembly through the boom 20 and stick 23. With the scoops open, the compaction plate 80 is exposed downwardly and, as the bucket assembly 30 is forced into the bulked material, the plate compacts a relatively large area of the material. In this manner, the unusable air spaces in the bulked material are reduced and the truck may effectively haul a greater load than would be possible if the bulked material were not compacted.

The rotor 50 allows the operator to properly orient the bucket assembly 30 relative to truck bed 14 regardless of the position of the crane 10 relative to the truck thus saving time in the loading and compacting operation.

The combined use of a compaction plate equipped bucket assembly and a boom capable of exerting a positive downward force on the bucket assembly, permits the operator to compact the material without the time consuming added steps of closing and reopening the scoops after first dumping the material. Positive application of the downward force by the hoist cylinders 25, rather than merely dropping the bucket, also permits a greater degree of compaction and control thereof, as previously explained.

Although the loading apparatus shown and described herein employs hydraulically actuated cylinders 15, 27 and 58 for operating the boom 20, stick 23 and scoops 31 and 32, it is also contemplated that pneumatically actuated cylinders can be employed to perform these functions. While the preferred embodiment of the invention has been described in considerable detail, it is to be understood that many rearrangements and modifications may be resorted to without departing from the scope of the invention as defined in the following claims.

What is claimed is:

1. A method of compacting loose material with a clam-shell type bucket having a compaction plate between opposed clam-shell scoops, comprising the steps of closing the scoops of the bucket about the material to pick it up, opening the scoops of the bucket to a position wherein said compaction plate lies substantially in a plane defined by the cutting lip edges of the open scoops to dump the material, and mechanically applying a positive downward force on the open bucket and compaction plate to compact the loose material.

2. A method of compacting material discharged from a clam-shell type of bucket assembly wherein a pair of bucket scoops are pivotally connected on a rigid hinge block structure having a generally flat lower surface disposed between upper portions of the scoops when closed and substantially in a plane defined by the lowermost edges of the scoops when opened, said method comprising; supporting the bucket assembly on a positively controlled manipulating member, lowering the manipulating member and bucket assembly as a unit onto said discharged material while the scoops are open, and then mechanically applying to said hinge block structure and scoops of said bucket assembly through said manipulating member an increasing, positive, downward force for compacting said material.

3. The method as set forth in claim 2 wherein said manipulating member is a rigid member and said bucket assembly is pivotally supported about a fixed horizontal axis on said manipulating member.

4. Apparatus for compacting loose material comprising support means, boom means carried by and extending from said support means, bucket means connected to said boom beans, and means to positively exert a downward force on said bucket means, said bucket means including a frame member, a pair of opposed scoops pivoted to said frame member, opening and closing means operatively connected to said scoops, and plate means rigidly secured to said frame member within said scoops in a substantially horizontal position and lying substantially within a plane defined by the cutting lip edges of the open scoops.

5. A device as set forth in claim 4 wherein said opening and closing means comprises hydraulically actuated piston and cylinder means extending between said frame member and said scoops.

6. A device as set forth in claim 4 wherein said apparatus includes pivot means between said boom means and said bucket means about which said bucket means pivots in a substantially vertical plane.

7. A device as set forth in claim 4 wherein said positive force exerting means comprises hydraulically actuated piston and cylinder means so arranged as to exert a downward force upon the portion of said boom means to which said bucket means is connected.

8. A device as set forth in claim 4 wherein said bucket means includes rotor means adapted to rotate the bucket means in a substantially horizontal plane.

References Cited
UNITED STATES PATENTS

| | | | |
|---|---|---|---|
| 3,061,957 | 11/1962 | Fehlmann | 37—195 |
| 1,259,129 | 3/1918 | Rawley et al. | 37—184 |
| 1,437,392 | 12/1922 | Botten | 37—184 |

HUGO O. SCHULZ, *Primary Examiner.*